E. BUTLER.
SAND BOX.
APPLICATION FILED MAY 19, 1921.
1,389,544.
Patented Aug. 30, 1921.
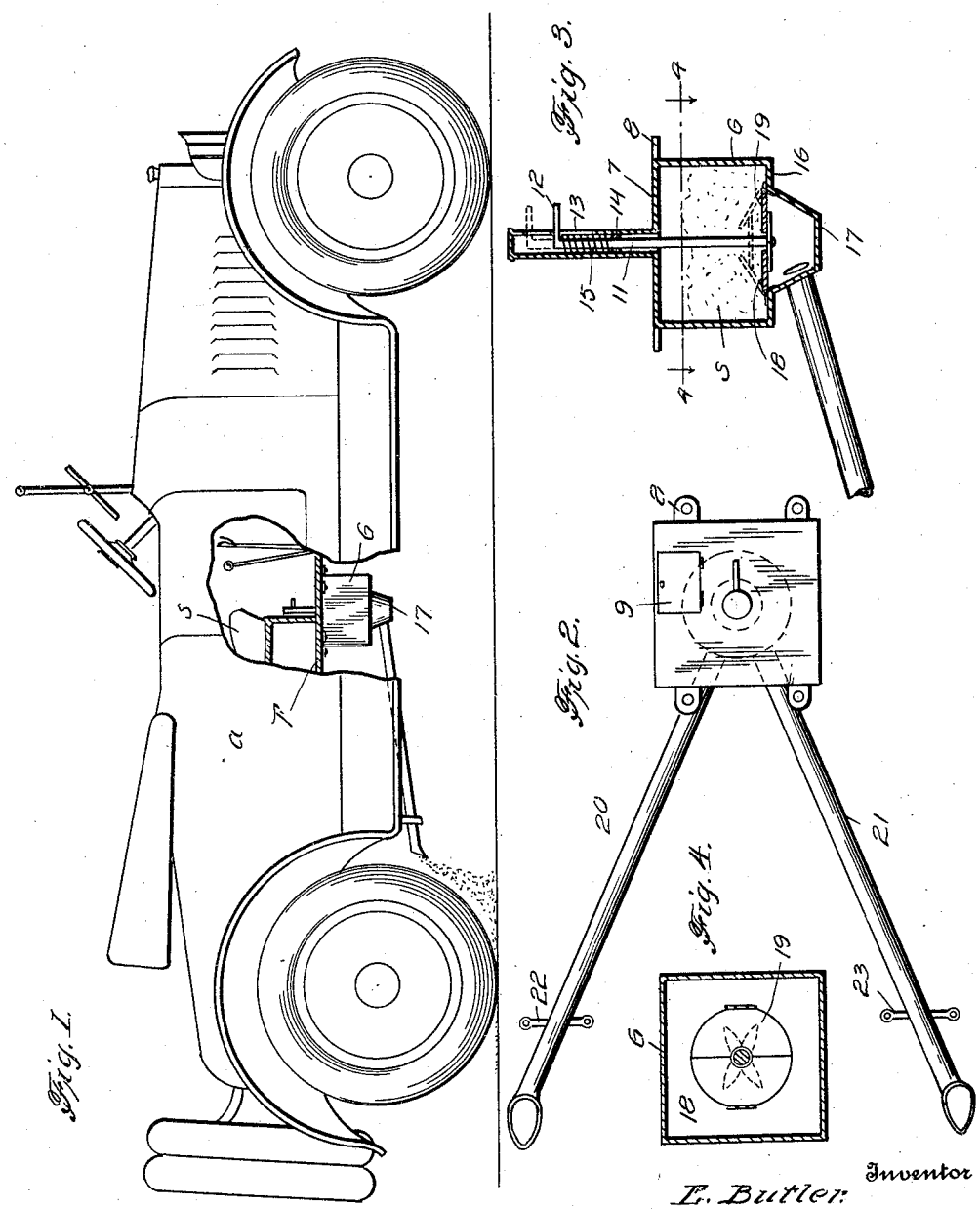
Inventor
E. Butler.
By
Geo. F. Kimmel. Attorney

UNITED STATES PATENT OFFICE.

EDITH BUTLER, OF MERCER, PENNSYLVANIA.

SAND-BOX.

1,389,544. Specification of Letters Patent. Patented Aug. 30, 1921.

Application filed May 19, 1921. Serial No. 470,805.

*To all whom it may concern:*

Be it known that I, EDITH BUTLER, a citizen of the United States, residing at Mercer, in the county of Mercer and State of Pennsylvania, have invented certain new and useful Improvements in Sand-Boxes, of which the following is a specification.

The invention relates to an automobile sand box and more particularly to that class of devices or attachments adapted to be secured below the body of a motor vehicle whereby a quantity of sand may be scattered in front of and to the sides of the rear wheels of the vehicle to prevent the same from skidding.

The primary object of the invention resides in the construction of an attachment or sanding device adapted to be positioned and arranged beneath the body of a motor vehicle and preferably in proximity to the seat of the operator or driver, including foot operated means within the sand box whereby a quantity of sand may be distributed in front of the rear wheels of the motor vehicle and thus prevent the same from skidding on paved streets for instance, or soft ground.

Another and very important object of the invention is the provision of a sanding device of the class described designed for use and adapted to be installed on practically any type of motor vehicle, and one in which the parts are extremely simple in construction, easily assembled, rigid and durable, highly efficient in operation, practical and capable of being manufactured at a very low cost whereby its commercial possibilities are greatly enhanced.

With these objects in view and others which will be suggested and manifest as the purpose and nature of my invention are revealed in the following specification and drawing wherein I have shown a preferred embodiment thereof, Figure 1 is a perspective view, partly broken away, of a conventional type of automobile, showing the invention as applied.

Fig. 2 is a plan of the detached sanding attachment.

Fig. 3 is a vertical sectional view thereof.

Fig. 4 is a section through the sand box taken on the line 4—4.

Referring now to the drawings, wherein like parts designate corresponding parts throughout the specification, A designates the conventional motor vehicle to which the invention is applied, and S the front portion of the seat thereof, and F the flooring beneath which the attachment is secured, which will now be described in detail.

Referring now to Figs. 2 and 3 in particular, the attachment comprises a substantially square box 6 having its top 7 formed with front and rear attaching ears 8 whereby the said container may be secured to and beneath the flooring F of the motor vehicle.

The top 7 of the container 6 may be provided with a hinged closure member 9 which may be raised through a cut out portion in the flooring of the motor vehicle, or if desired, the said closure 9 may constitute a part of the flooring to be raised whereby a quantity of sand may be introduced into the container for the purpose hereinafter to be set forth in detail. The said top 7 is also formed with a cylindrical, raised extension 10 adapted to confine the upper extremity of an actuating rod 11, the horizontal arm 12 of which operates in the slot 13 formed in said extension, it being readily observed that said actuating rod may be foot operated by the driver at his position in the seat of the vehicle. A stop 14 is also positioned within the raised extension in which the lower end of the resilient spring 15 bears, said spring being held on the upper end of the rod 11 as clearly shown by Fig. 3 of the drawings.

The bottom 15 of said container is provided with a hopper 17 to which the sand may drop when the hinged valves 18, 19 are raised by the lower end of the actuating rod 11 to the dotted line position as shown by Fig. 3.

Communicating with the hopper 17 there is provided a pair of downwardly extending rearwardly directed chutes or tubes 20, 21 held by the brackets 22, 23, said chutes or tubes having flared openings at their lower ends whereby the sand will be distributed and spread in front of and to the sides of the rear wheels of the motor vehicle to prevent the same from slipping and skidding as is well understood.

From the above construction, it will be readily recognized that as the actuating rod 11 is raised and the valve opened, a stream of sand will be directed to the hopper 17 and through the downwardly and rearwardly extending chutes 20, 21 whereby the sand will be distributed, in the manner above set forth.

In the accompanying drawings, I have illustrated my invention embodied in one form by way of example, and which in practice has been found to be highly satisfactory in obtaining the desired results. It will be obvious however that other embodiments may be adopted and that various changes in the details of construction may be resorted to by those skilled in the art without departing from the spirit and scope of the invention. It is furthermore understood that the invention is not necessarily limited or restricted to the precise elements shown except in so far as such limitations are specified in the subject matter being claimed.

Having thus fully described my invention, what I now claim as new and desire to secure by Letters Patent of the U. S. is:—

1. An automobile attachment of the class described comprising a sand box adapted to be secured beneath the flooring of a motor vehicle in proximity to the driver's seat, an actuating rod extending through the flooring of the vehicle and valves in the bottom of said box operable by said rod for releasing the sand, and chutes communicating with said box whereby a stream of sand may be distributed in front of the driving wheels of the automobile.

2. An automobile attachment of the class described, comprising a sand box adapted to be secured beneath the flooring of a motor vehicle in proximity to the driver's seat, a spring controlled actuating rod extending through the flooring of the vehicle and hingedly connected valves in the bottom of the box operable by said rod for releasing the sand, and downwardly and rearwardly directed chutes communicating with said box whereby a stream of sand may be distributed in front of the driving wheels of the automobile.

3. An automobile attachment of the class described comprising a sand box adapted to be secured beneath the flooring of a motor vehicle, said box having a vertical extension adapted to extend through the flooring of a motor vehicle in proximity to the driver's seat, and provided with a hopper in the bottom thereof, a spring controlled actuating rod operable within the box and said extension, hingedly connected valves within said box operable by said actuating rod for releasing the sand to said hopper, a pair of downwardly and rearwardly extending chutes communicating with said hopper and having flared open ends whereby a stream of sand may be distributed in front of and at the sides of the rear driving wheels of the automobile.

In testimony whereof, I affix my signature hereto.

EDITH BUTLER.